Jan. 3, 1933.    R. C. BLAYLOCK    1,892,927
CONTROL SURFACE FOR AIRCRAFT
Filed March 19, 1930    2 Sheets-Sheet 1

INVENTOR
RAYMOND C. BLAYLOCK
BY
ATTORNEY

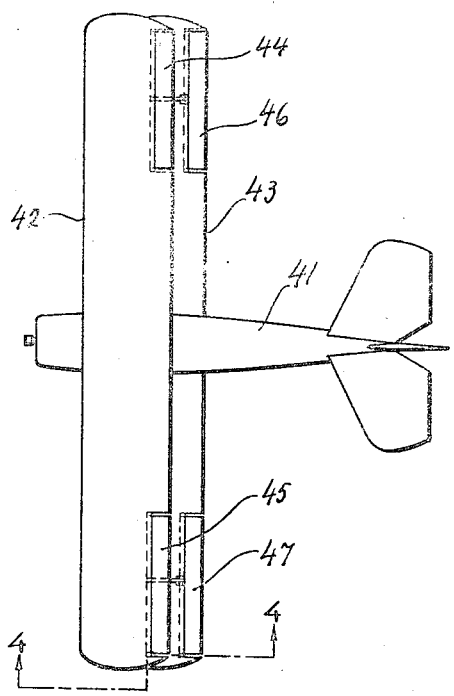
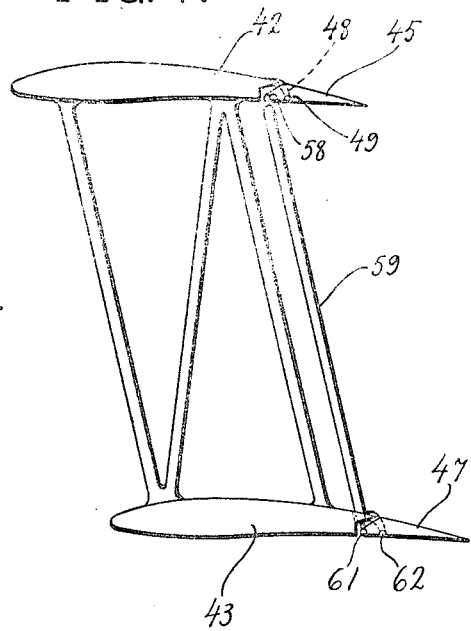
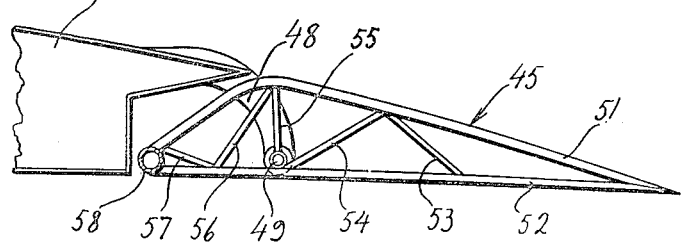

Patented Jan. 3, 1933

1,892,927

UNITED STATES PATENT OFFICE

RAYMOND C. BLAYLOCK, OF HEMPSTEAD, NEW YORK, ASSIGNOR TO CURTISS AEROPLANE & MOTOR COMPANY, INC., A CORPORATION OF NEW YORK

CONTROL SURFACE FOR AIRCRAFT

Application filed March 19, 1930. Serial No. 436,962.

This invention relates to aircraft and more especially to pivoted aerofoils therefor which are so designed that part of the air surface of the aerofoil is located in front of the pivot and part of said surface is in the rear thereof.

Prior to my invention partially counterbalanced pivoted surfaces have been used and it has possibly been proposed to provide aerofoils having a larger portion of the air surface positioned rearward of the pivot than in front thereof, but having the front portion of the aerofoil of heavier construction so that the weight of the aerofoil is exactly balanced at said pivot. It has never been proposed, however, so far as I am aware, to construct the forward heavier portion of such an aerofoil so that it not only serves the purpose of partly balancing the weight of the larger rearward portion of the aerofoil, but also so that it takes most of the stresses of the aerofoil and particularly the torque stresses which would otherwise be carried by the beam about which the aerofoil pivots.

One of the objects of my invention is to provide a practical pivoted aerofoil having a greater weight in proportion to the area of the air surface in front of the pivot than behind said pivot.

A further object of my invention is to include in such an aerofoil means capable both of providing an increase in weight in front of the pivot and also of bracing the said aerofoil.

A further object is to provide a balanced aileron pivoted intermediate its forward and rearward ends, having a greater surface rearward of the pivot than in front thereof, and having a truss bracing in front of the said pivot for carrying substantially all of the torque loads of the said aerofoil.

A further object is to provide control surfaces for aircraft which are dynamically stable as contrasted with the usual surfaces which are dynamically unstable.

A further object is the elimination of the "flutter" which may be caused by a dynamically unstable condition.

Further objects will be apparent from a reading of the subjoined specification and claims and from a consideration of the accompanying drawings.

In order to explain the invention more clearly, one embodiment thereof is shown in said drawings, in which:

Fig. 3 is a plan view of another airplane also constructed according to my invention;

Fig. 4 is a side elevation of the wings of said airplane; and

Fig. 5 is a side elevation on an enlarged scale of one of the ailerons shown in Fig. 4, the outer covering thereof having been removed.

Figure 1:
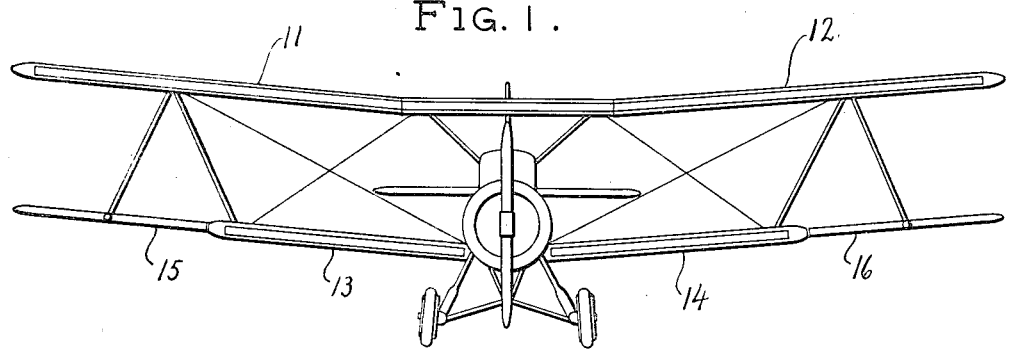
Fig. 1 is a front elevation of an airplane equipped with balanced ailerons illustrative of my invention.

Referring specifically to the drawings, I have shown in Fig. 1 an airplane equipped with upper wings 11 and 12, lower wings 13 and 14 and balanced ailerons 15 and 16. The ailerons 15 and 16 are symmetrical, so that there is no lift (either positive or negative) when the aerofoil is set at zero angle of incidence to the air stream.

Figure 2:
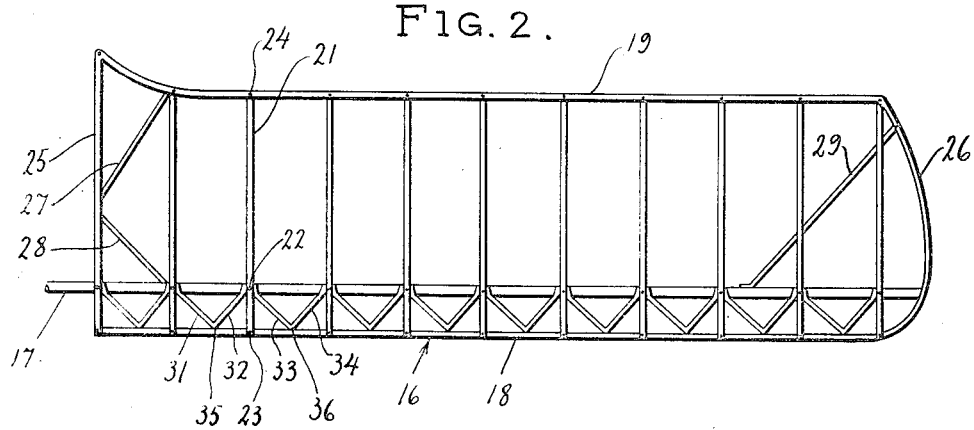
Fig. 2 is a plan view of one of the said ailerons with the cover removed and showing the novel truss bracing positioned mainly in the nose of the said aerofoil.

In Fig. 2 the aileron 16 is shown with the cover removed. As shown it comprises the pivot or intermediate spar 17 mounted in self-aligning bearings (not shown) in the wing 14, a front spar or leading edge strip 18, a rear spar or trailing edge strip 19, and a plurality of ribs 21. Each of the ribs 21 is joined as at 22 to the spar 17 and as at 23 and 24 to the spars 18 and 19, respectively. These joints may be by rivets if desired. End pieces 25 and 26 may be provided and diagonal bracing struts 27, 28 and 29 adjacent to the ends may also be provided and secured in any suitable manner to the pivot spar 17, the end pieces 25 and 26 and the rear spar 19. A plurality of truss braces such as those shown at 31, 32, 33 and 34 are provided and firmly secured to the junctions 22 between the ribs and the pivot spar 17. These braces extend diagonally forward from said junction points and are firmly secured to each other as at 35 and 36 and may be secured if desired to the front spar 18. These joints may also be fastened by rivets if desired.

Air forces acting upon the surfaces of the ailerons 15 and 16 cause them normally to tend to turn parallel to the air stream into which they are headed. Inasmuch as the aerofoils 15 and 16 are symmetrical and inasmuch as the weight in front of the pivotal spar 17 balances the weight rearward thereof, factors other than the air stream do not appreciably affect this tendency. The weight necessary to counter-balance the larger portion of the aileron rearward of the pivot spar 17 is provided largely by the cross or diagonal braces such as 31, 32, 33 and 34.

These cross braces not only serve to provide weight, but are also designed to transmit the torque loads on the pivot spar 17 from the outer end and intermediate portions of the aileron to the inner end thereof and thus enable the spar 17 to be constructed very much lighter than it would be necessary to construct it were it designed to carry and withstand the accumulated torque loads which would be built up in the aileron from the outer end to the inner end thereof. Thus, the necessity for additional weight in the nose is turned to advantage by providing additional functions for the elements which give the weight.

In the airplane shown in Figs. 3, 4 and 5 conventional ailerons are used. Therein I have shown a bi-plane airplane equipped with a fuselage 41, an upper wing 42 and a lower wing 43. The upper wing has ailerons 44 and 45 and the lower wing has ailerons 46 and 47.

The ailerons on each side are similarly carried and description of one pair will be sufficient to explain both.

The aileron 45 is mounted on a bracket 48 for pivotal movement about an axis 49. As may be clearly seen in Fig. 5 the pivot 49 is positioned intermediate the front and rear ends of the aileron 45 but is positioned nearer the front end than the rear end. Each of the ribs of the aileron may be constructed of a plurality of chord members and strut members such as those shown at 51, 52, 53, 54, 55, 56 and 57 in Fig. 5. The main beam 58 of the aileron is located at the extreme nose thereof and is adapted to carry a large part of the torsion and bending loads imposed by air forces upon the said aileron. This beam is relatively heavy compared to the rest of the aileron and the weights are so arranged that they are balanced only slightly to the rear of the pivot 49. It is to be noted, however, that due to the larger amount of surface of the aileron to the rear of the pivot 49 the center of pressure will normally be to the rear of the pivot 49 and air forces acting upon said ailerons will tend always to turn them to their normal position which is that shown in Figs. 4 and 5. Operating means are provided by which one of the ailerons 45 or 47 may be controlled from the cockpit of the airplane. An inter-aileron strut 59 is provided and connects the beam 58 with a similar beam 61 provided in the aileron 47. The weight of the strut 59 is sufficient to cause the weight balance of the two ailerons 45 and 47 to be substantially at the pivots 49 and 62. If desired, such ailerons may be constructed without the inter-aileron strut 59, whereupon the parts will be so arranged and the beam 58 so proportioned that the balance of the aileron alone will be substantially at the pivot.

It may be thus seen that air forces acting upon the ailerons tend to turn them normally to the positions shown in Figs. 4 and 5 and that the weight is so proportioned that there is not the tendency to flutter which would be present were the center of gravity positioned at a substantial distance behind the pivot.

It is to be understood that the above described embodiment of my invention is for the purpose of illustration only and various changes may be made therein without departing from the spirit and scope of the invention.

I claim as my invention:

1. In an airplane, a symmetrical aileron comprising a front spar, a rear spar, an intermediate spar about which said aileron is arranged to pivot, a plurality of ribs connecting the said spars and extending a greater distance to the rear of said pivot spar than in front thereof so that a greater area surface of the aileron is exposed to the wind stream to the rear of said pivot than there is in front thereof and means, comprising a diagonal truss structure positioned, for the major part, in front of said pivot spar, fastened to said spar at the junctions of the ribs with the pivot spar and also fastened to the front spar for providing extra weight to counter-balance the weight and moment of the aileron structure in the rear of said pivot spar and also for withstanding the torque strains which would otherwise be imposed upon said pivot spar.

2. In an airplane, a symmetrical aileron comprising a front spar, an intermediate spar about which said aileron is arranged to pivot, and means comprising a diagonal truss structure positioned entirely in front of said pivot spar and fastened to the pivot spar and to the front spar, for providing extra weight to counter-balance the weight and moment of the aileron structure in the rear of said pivot spar and also for withstanding the torque strains which would otherwise be imposed upon said pivot spar.

3. In an airplane, a symmetrical aileron comprising a front spar, a rear spar, an intermediate spar about which said aileron is arranged to pivot a plurality of ribs connecting said spars and extending a greater distance to the rear of said pivot spar than in front thereof so that a greater area of surface of the aileron is exposed to the wind stream to the rear of said pivot than there is in front thereof, and means disposed wholly within the confines of said aileron between said front spar and said pivot spar for providing extra weight to counter-balance the weight and moment of the aileron structure in rear of said pivot spar and also for withstanding the torque strains which would otherwise be imposed upon said pivot spar.

4. In an airplane, an aerofoil comprising a front spar, a rear spar, an intermediate spar about which said aerofoil is arranged to pivot, a plurality of ribs connecting said spars and extending a greater distance to the rear of said pivot spar than in front thereof so that a greater area of surface of the aerofoil is exposed to the wind stream to the rear of said pivot than there is in front thereof, and means comprising a diagonal truss structure positioned entirely in front of said pivot spar and fastened to said pivot spar and said front spar, for providing extra weight to counter-balance the weight and moment of the aerofoil structure in rear of said pivot spar and also for withstanding the torque strains which would otherwise be imposed upon said pivot spar.

5. In an airplane, a pivoted aerofoil having a greater area of surface in the rear of said pivot than in front thereof, and means disposed wholly within the confines of said aerofoil and extending between said pivot and the leading edge of said aerofoil for counter-balancing the weight of the structure in rear of said pivot, said means comprising a truss bracing structure for carrying the greater part of the torque load of said aerofoil.

6. In an airplane, a pivoted aerofoil having a greater surface area in the rear of said pivot than in front thereof, and torsion bracing disposed within the confines of said aerofoil between the leading edge thereof and said pivot, said torsion bracing constituting a complete counter-balance for the unbalanced weight of the aerofoil structure rearward of said pivot.

7. In an airplane, a pivoted aerofoil having a greater surface area in the rear of said pivot than in front thereof, and means wholly within said aerofoil and entering into and forming an actual part of the aerofoil trussing system and disposed wholly in advance of said pivot for wholly counterbalancing the unbalanced weight of the aerofoil structure rearward of said pivot.

8. In an airplane, a pivoted aerofoil having a greater surface area in the rear of said pivot than in front thereof, and means wholly within the aerofoil, entering into the aerofoil trussing system, forming torsion bracing for said aerofoil and disposed wholly in advance of said pivot for wholly counterbalancing the unbalanced weight of the aerofoil structure rearward of said pivot.

In testimony whereof I hereunto affix my signature.

RAYMOND C. BLAYLOCK.